(12) United States Patent
Tu et al.

(10) Patent No.: US 7,835,758 B2
(45) Date of Patent: Nov. 16, 2010

(54) METHOD AND MOBILE APPARATUS OF RECEIVING A MULTIMEDIA MESSAGE

(75) Inventors: Guan-Hua Tu, Yongkang (TW); Jyh-Chun Wang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 286 days.

(21) Appl. No.: 11/266,255

(22) Filed: Nov. 4, 2005

(65) Prior Publication Data

US 2006/0099942 A1    May 11, 2006

(30) Foreign Application Priority Data

Nov. 11, 2004    (TW) .............. 93134545 A (51) Int. Cl.
*H04W 4/00* (2009.01)
*G06F 15/16* (2006.01)

(52) U.S. Cl. ............... 455/466; 709/203; 709/206

(58) Field of Classification Search ........ 370/349; 455/406, 466, 412.1, 412.2; 709/203, 206
See application file for complete search history.

(56) References Cited

U.S. PATENT DOCUMENTS

| | | | |
|---|---|---|---|
| 6,253,061 B1 * | 6/2001 | Helferich | 340/7.22 |
| 6,996,393 B2 * | 2/2006 | Pyhalammi et al. | 455/412.1 |
| 7,181,538 B2 * | 2/2007 | Tam et al. | 709/246 |
| 2003/0119552 A1 * | 6/2003 | Laumen et al. | 455/557 |
| 2004/0111476 A1 * | 6/2004 | Trossen et al. | 709/206 |
| 2005/0193069 A1 * | 9/2005 | Brown et al. | 709/206 |
| 2005/0250520 A1 * | 11/2005 | Johnson et al. | 455/466 |
| 2005/0259604 A1 * | 11/2005 | Salmi | 370/310 |
| 2006/0194595 A1 * | 8/2006 | Myllynen et al. | 455/466 |

\* cited by examiner

*Primary Examiner*—Lester Kincaid
*Assistant Examiner*—Nathan Mitchell
(74) *Attorney, Agent, or Firm*—Rabin & Berdo, P.C.

(57) ABSTRACT

A receiver terminal, like a mobile apparatus or a mobile phone, downloads a multimedia message from a message center via a network. An arrival notification is first transmitted from the message center to the receiver terminal. In the notification, a length of the multimedia message is identified. The receiver terminal, however, checks a portion of the multimedia message downloaded to ensure the actual size indicated by the portion of the multimedia message is consistent with the length identified by the notification. If there is problem, users are inquired for confirmation to determine whether to continue downloading the rest portion of the multimedia message.

20 Claims, 9 Drawing Sheets

METHOD AND MOBILE APPARATUS OF RECEIVING A MULTIMEDIA MESSAGE

This application claims the benefit of Taiwan application Serial No. 93134545, filed Nov. 11, 2004, the subject matter of which is incorporated herein by reference.

BACKGROUND OF THE INVENTION

1. Field of the Invention

The invention relates in general to a transmission method for mobile communication messages, and more particularly to a method for transmitting a multimedia messaging service (MMS) message.

2. Description of the Related Art

Multimedia Message Service (MMS) is a type of message service. When a communication device transmits a multimedia message (or MMS message) to a mobile station, a message center established by operators relays the MMS message to the mobile station. MMS messages are messages that combine media contents of characters, sounds, pictures, and video clips. MMS are applied in various applications, such as multimedia greeting cards, name cards, presentations, and successive video-audio data. The protocol of MMS is an open standard drawn up by two important international mobile communication standard institutions, which are the third generation partnership project (3GPP) and wireless application protocol forum (WAP FORUM). Under cooperation of operators, mobile phone manufacturers, and other related companies or organizations, MMS has capability of cross-platform and cross-mobile-phone-brands.

Figure 1:
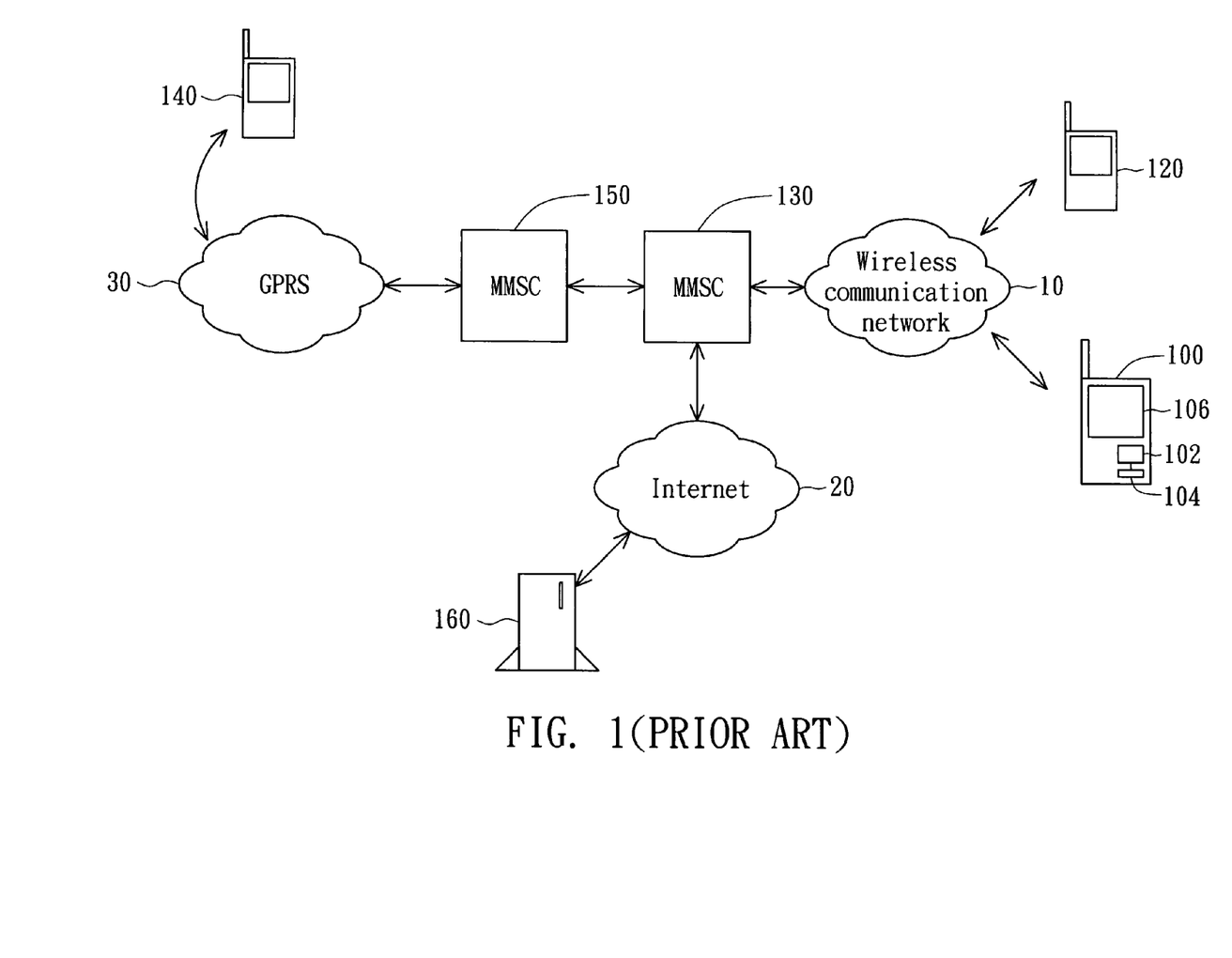
FIG. 1 is a schematic diagram of a conventional mobile apparatus applied to a wireless communication network providing MMS.

In addition to mobile phones, a personal digital assistant (PDA), a computer, or e-mail software may also be used for transmitting MMS messages. Referring to FIG. 1, a mobile apparatus 100 is applied in a wireless communication network 10 that provides MMS service. In FIG. 1, the mobile apparatus 100 is a mobile station capable of receiving MMS messages and is used for retrieving MMS messages via a message center 130 via the wireless communication network 10. MMS messages received by the mobile apparatus 100 are from various transmission terminals via the message center 130. For example, another mobile station 120 in the wireless communication network 10 transmits MMS messages to the mobile apparatus 100. Another kind of transmission terminal, say, a mobile station located in another wireless communication network, such as a GPRS mobile station 140 in the GPRS network 300, also can transmit MMS messages to the mobile apparatus 100 via the message centers 150 and 130. Moreover, a computer 160 coupled to the Internet 20 also can transmit MMS messages to the mobile apparatus 100 via the message center 130 coupled to the Internet 20.

When message centers receive a MMS message to be transmitted to a receiver terminal, the message center transmits a notification to the receiver terminal to notify that there is arrival of the MMS message. The notification includes information related to the MMS message, such as a sender (FROM), a receiver (TO), a subject, a size, and a retrieval address of the MMS message.

Figure 2A:
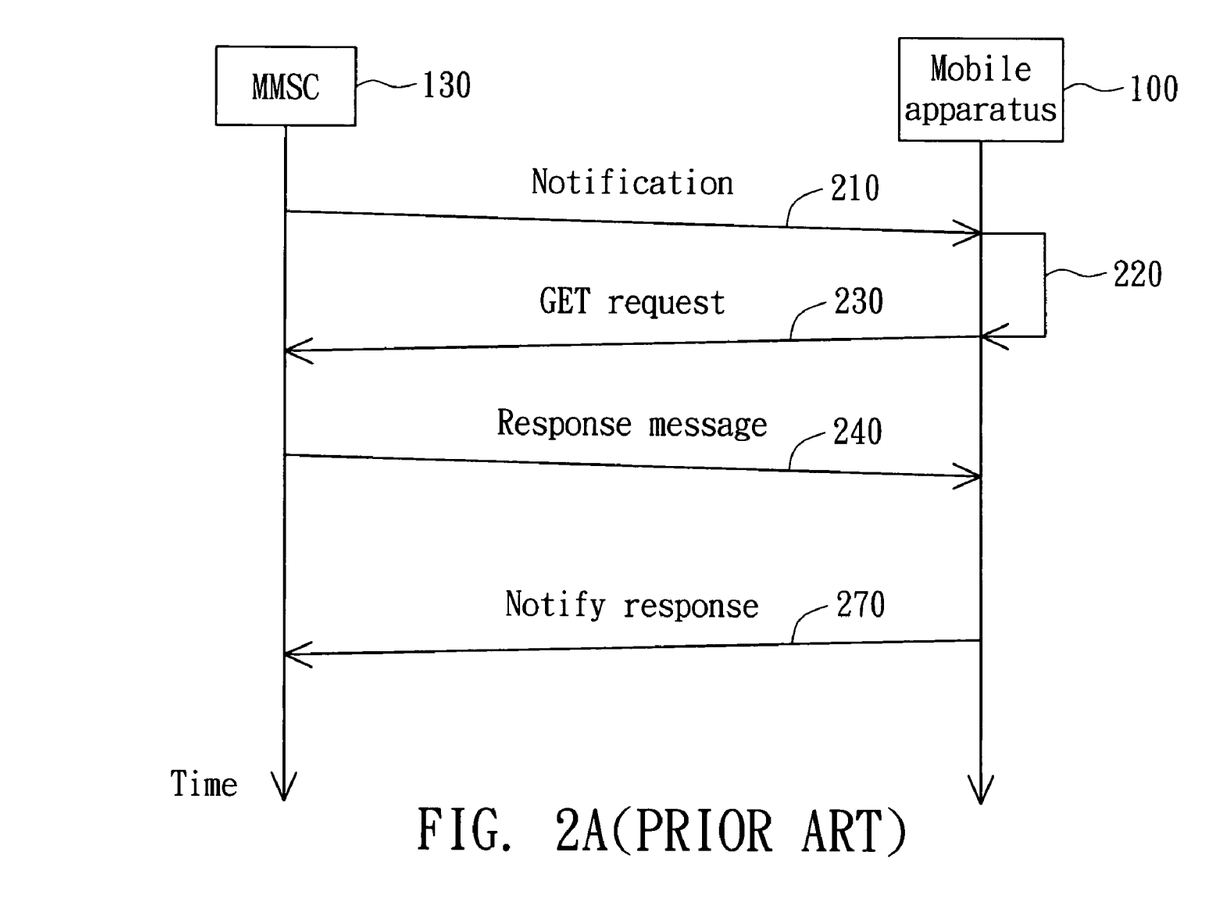
FIG. 2A is a procedure diagram of the conventional method for receiving a multimedia message in the mobile apparatus.

FIG. 2A illustrates a procedure for a mobile apparatus 100 to retrieve a MMS message from a message center 130 (marked as MMSC). When the message center 130 receives a MMS message from a sender, the message center 130 transmits a notification 210 to the mobile apparatus 100. On receiving the notification a response procedure 220 of the mobile apparatus 100 is executed for determining whether to retrieve the MMS message identified by the notification. When the mobile apparatus 100 determines to receive the MMS message, the mobile apparatus 100 transmits a GET request 230 to the MMS center for downloading the MMS message. The GET request 230 has many formats, such as a GET request of a hypertext transfer protocol (HTTP), or a GET request of a WAP session protocol (WSP). When the message center 130 receives the GET request 230, the message center 130 transmits the MMS message packaged into one or more response messages 240. When the whole MMS message is received, the mobile apparatus 100 transmits a notify response to the message center 130 to complete the task of transmitting the MMS message.

According to the size of the MMS message identified in the notification transmitted from the MMS center 130, the response procedure 220 of the mobile apparatus 100 determines whether to download the MMS message, that is, to determine whether to transmit a GET request 230 to the message center 130. Two conventional methods for retrieving the MMS message are introduced in the following description, which respectively use two different response procedures 220 to download MMS messages.

Figure 2B:
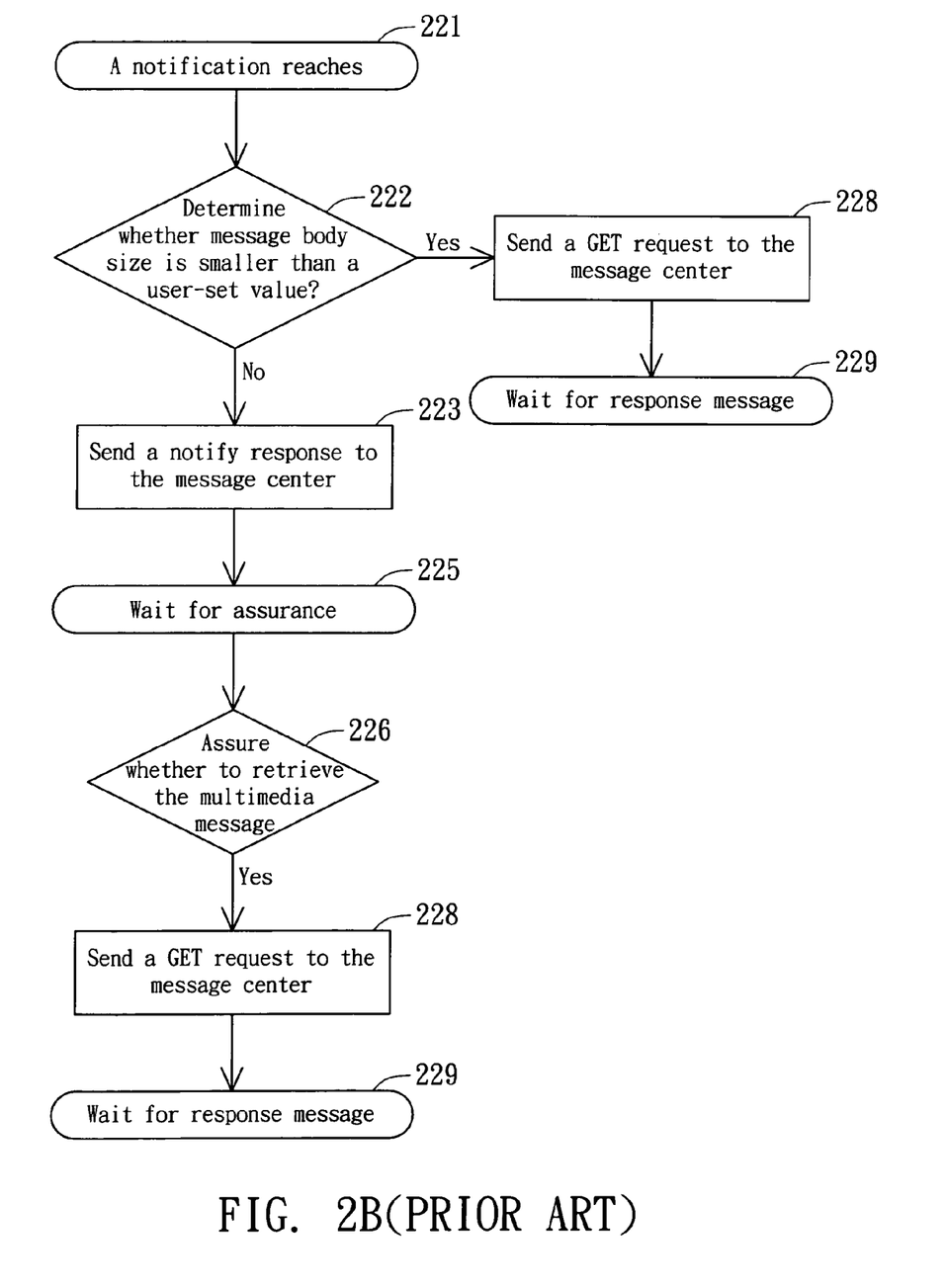
FIG. 2B is a flow chart of two conventional methods by which the mobile apparatus responses get requests to notification.

If the size of a MMS message identified in the notification is smaller than a predetermined acceptable value, such as 30 KB, usually a default value set by users, the message body of the MMS message is downloaded automatically. Such approach is called a message method of "immediate retrieval"; An example of using the "immediate retrieval" method is Nokia 6610 mobile phones. FIG. 2B is a flowchart illustrating the notification response procedure 220. As shown in step 221, a notification is received by the mobile apparatus 100. In step 222, the message body size identified in the notification is compared with a default value set by users. If the message body has a size smaller than the user set value, a GET request is transmitted to the message center (step 228). As shown in step 229, the mobile apparatus 100 starts to wait for the response message from the message center. By using this method, a user does not need to do any thing when the mobile apparatus is downloading MMS messages. If the MMS message is small, it is convenient for a user to use the "immediate retrieval" method.

Another conventional method for retrieving MMS messages is a message method of "delayed retrieval", in which a user to receive a MMS message needs to confirm whether to download the MMS message each time. The user determines whether to download the MMS message according to information provided in the notification, for example, the size of the MMS message and sender. Referring to FIG. 2B, in step 222, if the size of message body in the notification is not smaller than the user-set value, the reception terminal sends a notify response to the message center (step 223). Then, the mobile apparatus performs a waiting assurance procedure (step 225). In the waiting assurance procedure, the step 226 is performed to determine whether the user wants to retrieve the multimedia message. If so, the mobile apparatus transmits a GET request to the message center (step 228). Next, the response message is transmitted from the message center to the mobile apparatus (step 229).

In addition to the two methods mentioned above, the size of MMS message identified in the notification is usually the critical reference for most users in determining whether to download the MMS message. However, these methods have potential serious security issues. For example, an unstable MMS center may generate a notification identifying an incorrect message size smaller than an actual MMS message. Furthermore, those with malicious intentions, or computer hackers, may fabricate and transmit a notification identifying an incorrect message size. Garbage advertisement letters are another sort of MMS message misuse. Besides, if the actual size of a MMS message is larger than that identified in associated notification, a user may waste lots of unexpected money in downloading massive MMS messages under deceit.

Due to incorrect notification mentioned above, even if the mobile apparatus is configured to adopt the "immediate retrieval" message method and the maximum size of a MMS message to be automatically downloaded is given, the mobile apparatus may still download a MMS message of larger size, if the notification provides a fake size. In the same situation, even if the user is inquired, each time, about whether to download a MMS messages under the message method of "delayed retrieval", a MMS message of larger size may still be downloaded.

The problems mentioned above cause lots of trouble. Users waste time and money for improper messages. In conventional MMS technology, associated potential security issues are not well discussed and solved. To make MMS service more convenient and helpful for human life, it is important to find a better and effective way to manipulate MMS messages.

SUMMARY OF THE INVENTION

It is therefore an object of the invention to provide a method for receiving a multimedia message and a mobile station capable of receiving a multimedia message in order to effectively prevent multimedia messages with an improper size from being downloaded to the mobile station.

An embodiment according to the invention is a method for receiving a multimedia message. In the exemplary method, a receiver terminal receives the multimedia message via a message center. A predetermined message size is set at the receiver terminal, e.g. a mobile apparatus or a mobile phone. The method at least includes following steps. Receive a first part of a response message from the message center. Determine whether the length of the multimedia message indicated by the first part of the response message is larger than a predetermined message size. If the length of the first part is already larger than the predetermined message size, perform a confirmation procedure by inquiring the user whether to download the MMS message. Otherwise, receive a second part of the response message.

In addition, the above method may apply in various formats of multimedia messages, for preventing a mobile station from downloading messages with inconsistent size as that indicated in a notification provided by a message center.

Other objects, features, and advantages of the invention will become apparent from the following detailed description of the preferred but non-limiting embodiments. The following description is made with reference to the accompanying drawings.

DETAILED DESCRIPTION OF THE INVENTION

In an embodiment according to the invention, a portion of a multimedia message is used for indicating whether the multimedia message is larger than the size identified by a notification. If the indicated result renders that the multimedia message is larger than the expected value, users are inquired whether to continue downloading the rest portion of the multimedia message from a message center. By using the method, a multimedia message with improper size, though indicated with a fake or a inconsistent size in a notification by the message center, is not downloaded. Thus, users do not need to waste time and money on such fake or strange messages.

Figure 4:
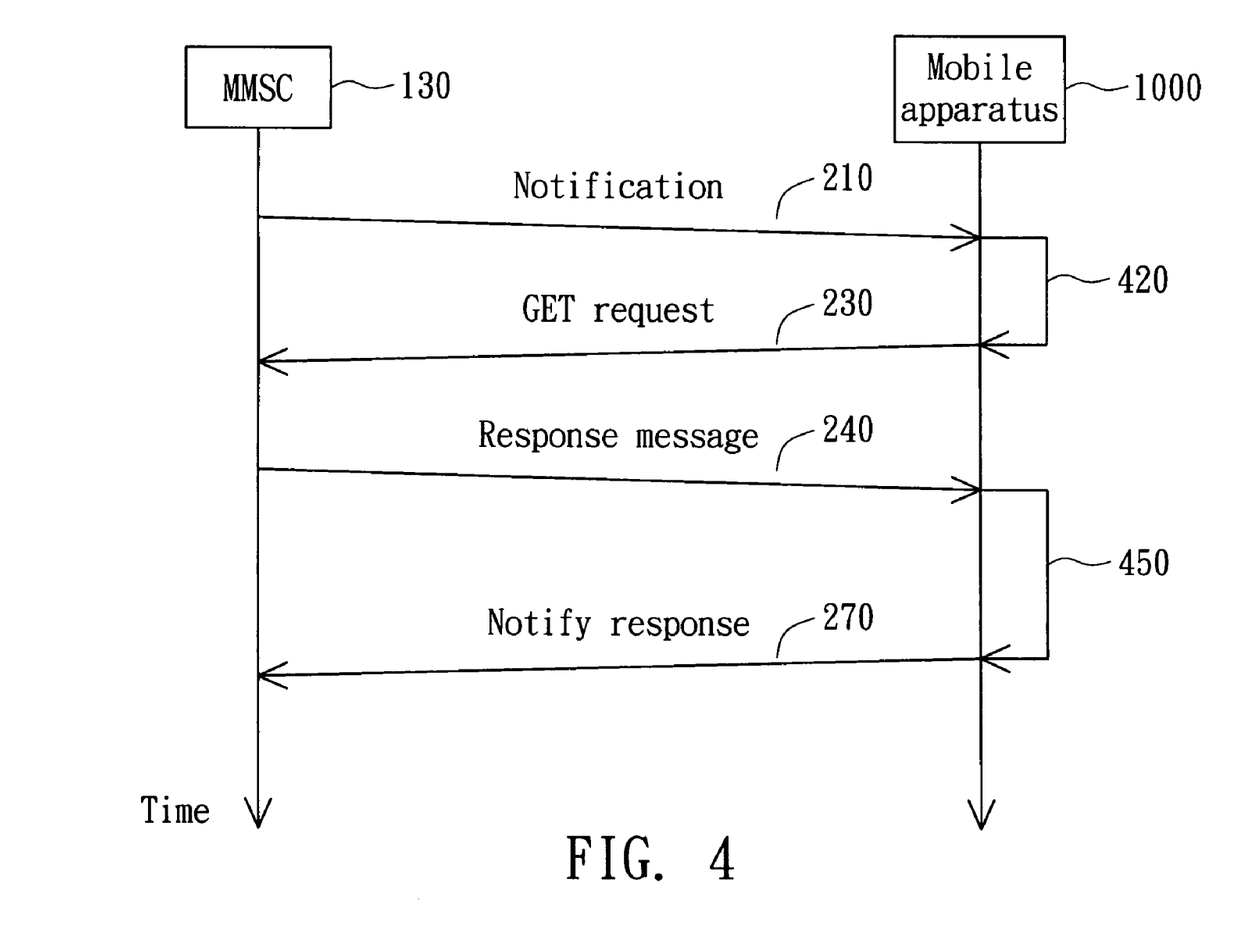
FIG. 4 is a flowchart illustrating a transmission protocol of an embodiment according to the invention.

FIG. 4 illustrates an example operation of the embodiment. In this example, when a response message 240 is transmitted to a mobile apparatus 1000, the mobile apparatus 1000 (as a receiver terminal) does not receive the response message unconditionally like the mobile apparatus 100 as illustrated in FIG. 2A. Instead, the mobile apparatus 1000 executes a response procedure 450 for determining whether a portion of a response message 240 indicates a message size within a predetermined message size, and thus prevents a multimedia message with an unexpected size downloaded to the mobile apparatus 1000. If the mobile apparatus 1000 finds that the length of the response message 240 is larger than the predetermined message size, the response procedure 450 triggers a confirmation procedure. Otherwise, the full response message is downloaded. The confirmation procedure is for determining whether to continue downloading the whole response message. An example of the confirmation procedure is to inquire the user. Another example of the confirmation procedure is to check one or more than one condition, e.g. a black list, for automatically determining whether to continue downloading whole response message. If the whole multimedia message is determined to be downloaded, the mobile apparatus 1000 transmits a notify response 270 to the message center 130 to complete the task of multimedia message transmission.

The response message may have various formats. In practice, the response procedure 450 varies in response to different formats of the response message. In the following description, two formats of the response message are introduced first. Then, two examples for illustrating how to implement associated process are also provided.

Figure 3A:
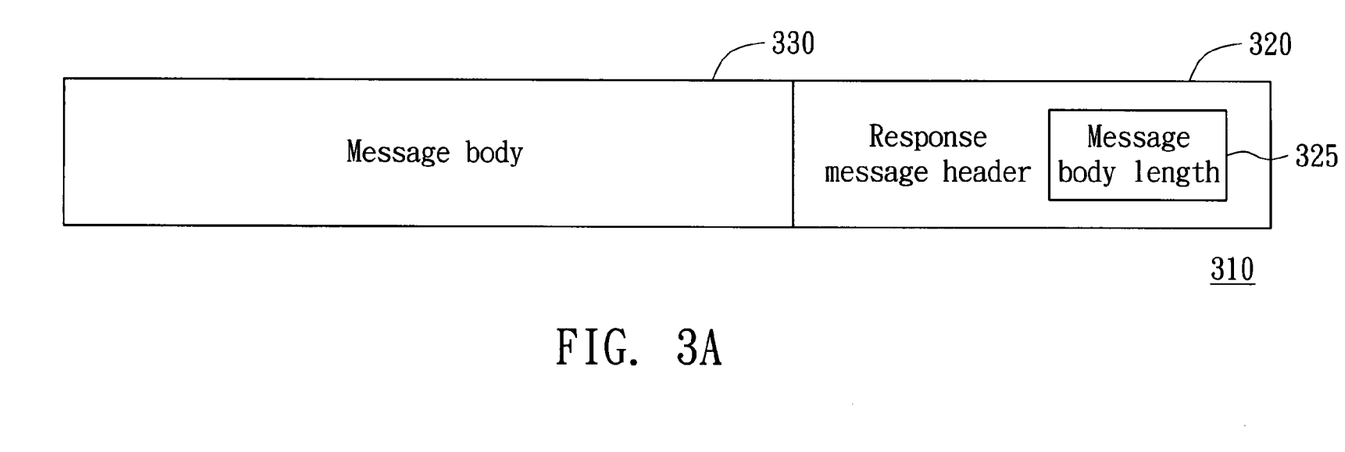
FIG. 3A is a format of a response message including a message body length.

FIG. 3A illustrates a first format of a response message. The response message 310 is composed of a first part 320 and a second part 330. The first part 320 is the header of a response message 310. In the header 320, a message body length 325 is indicated. An example of the first part 320 looks as follows.

HTTP/1.1 200 OK
Connection: Keep-Alive
Content-Type: application/vnd.wap.mms.message
Content-Length: 30720 (Message Body Length)

The second part 330 includes a message body of the multimedia message. The message body length is the length of the message body of the second part 330. The message center transmits the first part 320 and the second part 330 of the response 310 message separately.

Figure 3B:
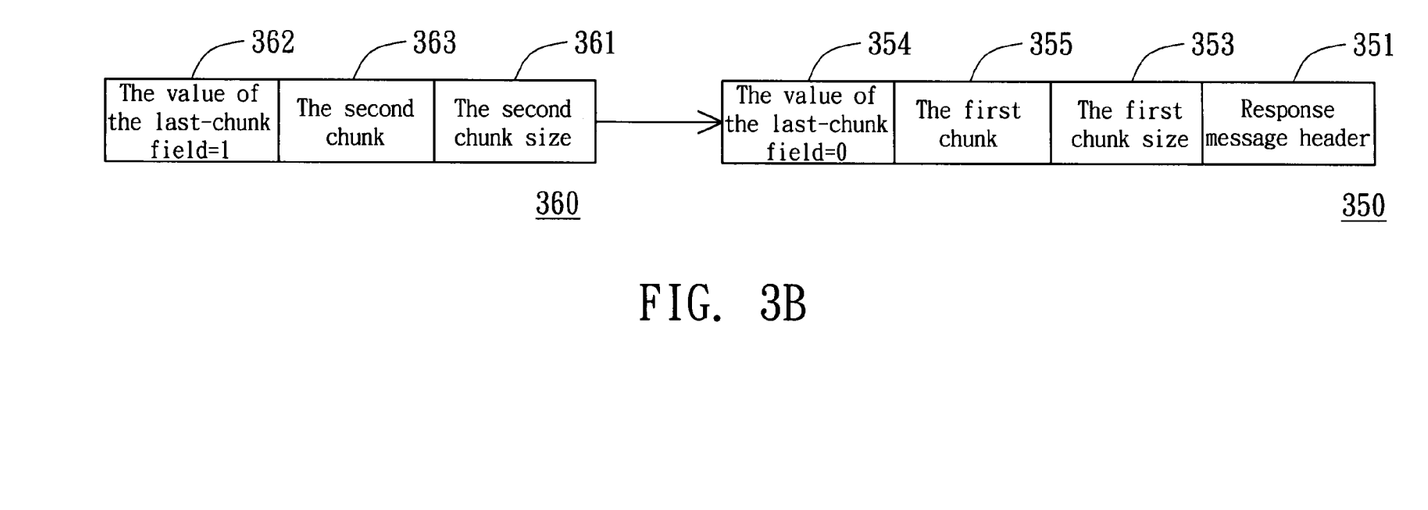
FIG. 3B is another format of a response message.

FIG. 3B illustrates another response message format includes N parts, and each part has a message length, where N is a positive integer. The multimedia message is divided into N parts. Each part corresponds to a chunk of the multimedia message. The message length of one part is the size of the chunk. As shown in FIG. 3B where N is 2, a response message includes a first part 350 and a second part 360. The multimedia message is divided into two chunks, that is, the first chunk 355 and the second chunk 363. The first part 350 and the second part 360 respectively include the first chunk 355 and the second chunk 363 of the multimedia message, and have message lengths of the first chunk size 353 and the second chunk size 363. An example of block 351 contains the content of "HTTP/1.1 200 OK <ENTER>Connection:Keep-Alive<ENTER>Content-Type:

Application/vnd.wap.mms.message<ENTER>Transfer-Encoding: chunked."

In an example, to determine whether a chunk is the last chunk, a field is reserved for indicating whether the chunk is the last chunk. As shown in FIG. 3B, both the first part 350 and the second part 360 of the response message include a last-chunk field. In the embodiment, the first chunk 355 included by the first part 350 is not the last chunk. The last-chunk field 354 included by the first part 350 is set as 0. The second chunk 363 included by the second part 360 is the last chunk, and the last-chunk field 362 included by the second part 360 is set as 1. No matter which format of response message the message center uses, the message center separately transmits each part of the response message to the mobile apparatus.

In the exemplary method, the message size identified by the notification is checked first as the first examination stage. Afterward, a second examination stage is performed according to actual size of the response message to determine where to download the whole multimedia message. Some unstable message center sometimes generates a notification providing error message size of a multimedia message and misleads conventional mobile apparatus. Besides, a notification, may also provide a fake message size of associated message body by some senders on purpose. In such cases, the response procedure 420 of the notification of a conventional mobile apparatus illustrated in FIG. 4 transmits a GET request to download a portion of the message body for further examination.

Next, an example of the response procedure 450 is provided for explaining how to determine whether to download whole multimedia message or discard the multimedia message when finding abnormal circumstances.

Figure 5A:
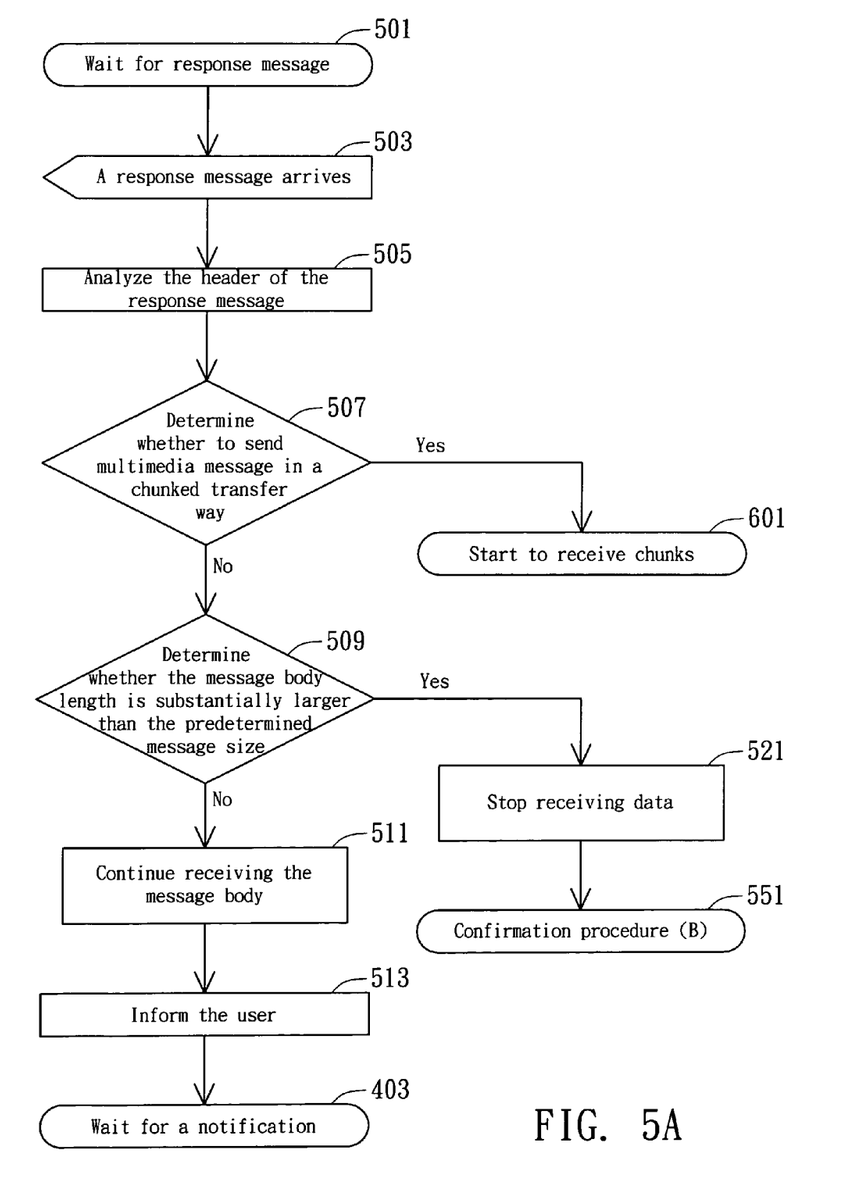
FIGS. 5A and 5B are flowcharts illustrating procedure of an embodiment.

FIG. 5A is a flowchart illustrating an example of the response procedure 450 in FIG. 4. Initially, the response procedure 450 waits for a response message (step 501). When a message arrives (step 503), the message is usually the first part of a response message. Next, in step 505, the header of the message is analyzed. In step 507, the format of the response message indicated by the message is determined, e.g. a multi-chunk message format or a two part message. If the multimedia message is not transmitted as a multi-chunk format, determine if the message contains a message body length of the multimedia message. If the message contains the message body length, the response message to be processed is classified as the format illustrated in FIG. 3A. Next, determine if the message body length is substantially larger than a predetermined message size, e.g. identified by associated notification from a message center (step 509).

If the first part of the response message contains the message body length (i.e. message length), it is determined that the response message has the format as shown in FIG. 3A. Consequently, the second part of the response message includes the message body. In step 509, if the message body length is not substantially larger than the predetermined message size, proceed to step 511 to continue downloading the message body from the second part of the response message. As shown in step 513, the user at the receiver terminal is informed that multimedia messages are completely downloaded. Next, return to step 403 in which the mobile apparatus waits for another notification. If the message body length is substantially larger than the predetermined message size, the mobile apparatus stops downloading the message body from the response message in step 521. Afterward, proceed to step 551 in which the mobile apparatus waits for a confirmation procedure (B).

Figure 5B:
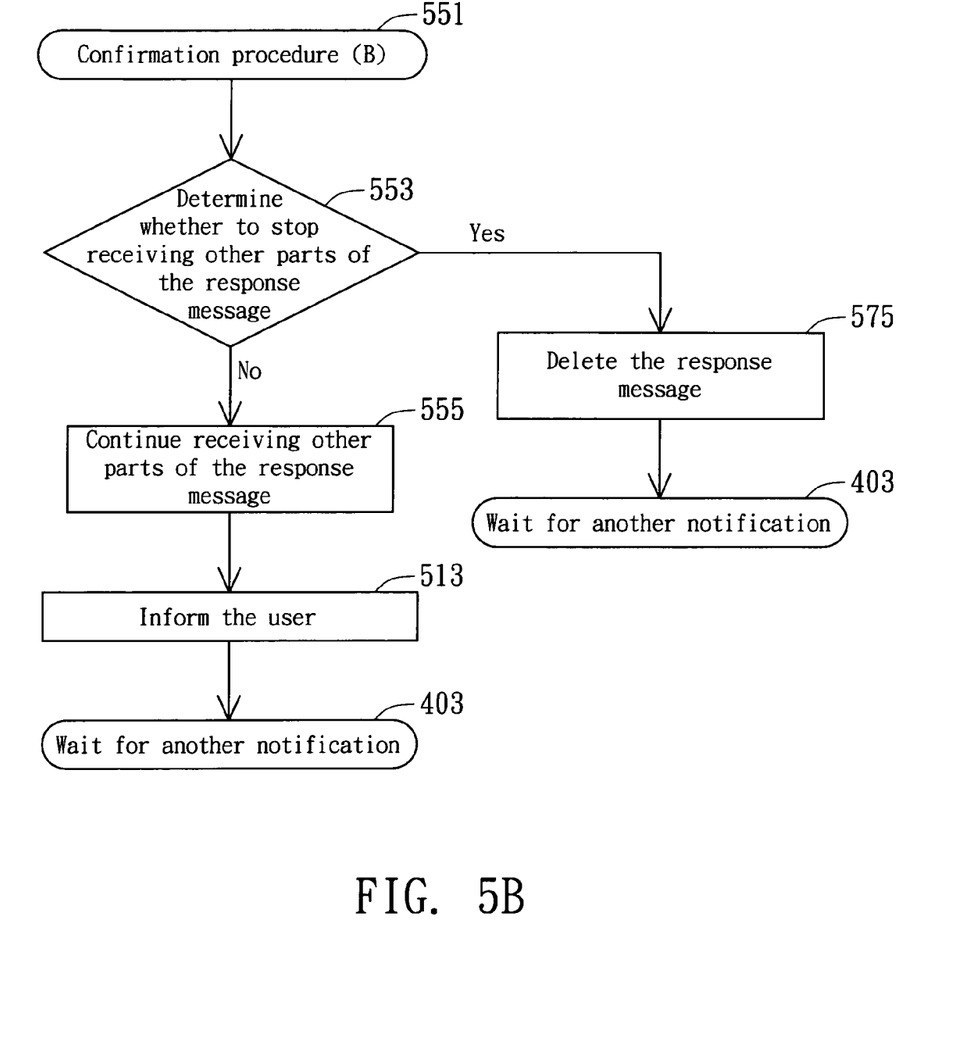

Referring to FIG. 5B, in the confirmation procedure (B), step 553 is for determining whether the user chooses to stop downloading other parts of the response message. If the user chooses not to download the multimedia message, the mobile apparatus discards the received response message data in step 575 and returns to step 403 to wait for another notification. Otherwise, the mobile apparatus continues downloading other parts of the response message. Next, the mobile apparatus informs the user that multimedia message has been completely downloaded (step 513). Following that, return to step 403 in which the mobile apparatus waits for another notification. In the confirmation procedure, when the user is too late to make a choice so that the transmission link is broken, the mobile apparatus sends another inquiry again to determine whether the user wants to reconnect the transmission link again. If the user would like to get online again, the mobile apparatus transmits a GET request 230, downloads the response message 240, and performs the response procedure 450 of response messages again. In another example, the confirmation procedure determines whether to continue downloading other parts of the response message automatically. The confirmation procedure may also determine whether to download other parts of the response message by reference to other information provided in the notification 210 from the message center. For example, the mobile apparatus holds a black list for stopping receiving multimedia messages from particular senders.

Because the first part 320 and the second part 330 of the response message are separately transmitted, the mobile apparatus 1000 receives the first part 320 first, and then determines whether to receive the second part 330. In other words, under the condition, the mobile apparatus 1000 is capable of determining whether to download the message body before doing so. Therefore, it completely avoids downloading message bodies under an abnormal circumstances.

In step 507, the determination of the format of the response message varies under different protocols. For example, if communication between the message center and the mobile apparatus is performed according to the hypertext transfer protocol (HTTP) version 1.1, the format of response message is determined by checking a header field for discriminating transmission ways identified in the arrived message, i.e., a transfer-encoding field. When the transfer-encoding field is chunked, it represents that the multimedia message is transmitted by a chunked transfer way. On the other hand, the transfer-encoding field is not defined in HTTP edition 1.0, and its transfer method is to inform the mobile apparatus of message length and then start to transmit data to the other side, like the format as shown in FIG. 3A. Because a mobile apparatus may receive multimedia messages from a message center via HTTP version 1.0 or 1.1, the mobile apparatus first determines whether HTTP version 1.0 or 1.1 is used. If HTTP version 1.0 is used, it is capable of determining whether the received message includes the message body length of a multimedia message. If the received message includes the message body length of the multimedia message, the result indicates that the response message has the format as in FIG. 3A. If the HTTP edition 1.1 is used, it is capable of determining whether the multimedia message is transmitted in a chunked transfer way according to the above-mentioned transfer-encoding field.

In step 507, if the multimedia message is transmitted by chunks, the received message in step 503 is the first part of the response message as the format shown in FIG. 3B.

Referring to FIG. 3B, the first part 350 of the response message includes the first chunk 355 of multimedia message and a message length, that is, a first chunk size 353. The first part 350 of the response message of such format is not received in parts and has to be downloaded as a whole. In other words, in the example, when receiving the response message having the format of FIG. 3B, the mobile apparatus needs to download the first part 350 of response message including the first chunk 355 first, and then determines whether to receive the second part of response message according to the message length of the first chunk 355, i.e. the first chunk size 353. That is to say, the mobile apparatus receives the first chunk 355 first, calculates the amount of data received, and determines whether to download the next part of response message according to the received total data.

In step 601, the mobile apparatus starts receiving other parts of the response message including multiple chunks.

Figure 6A:
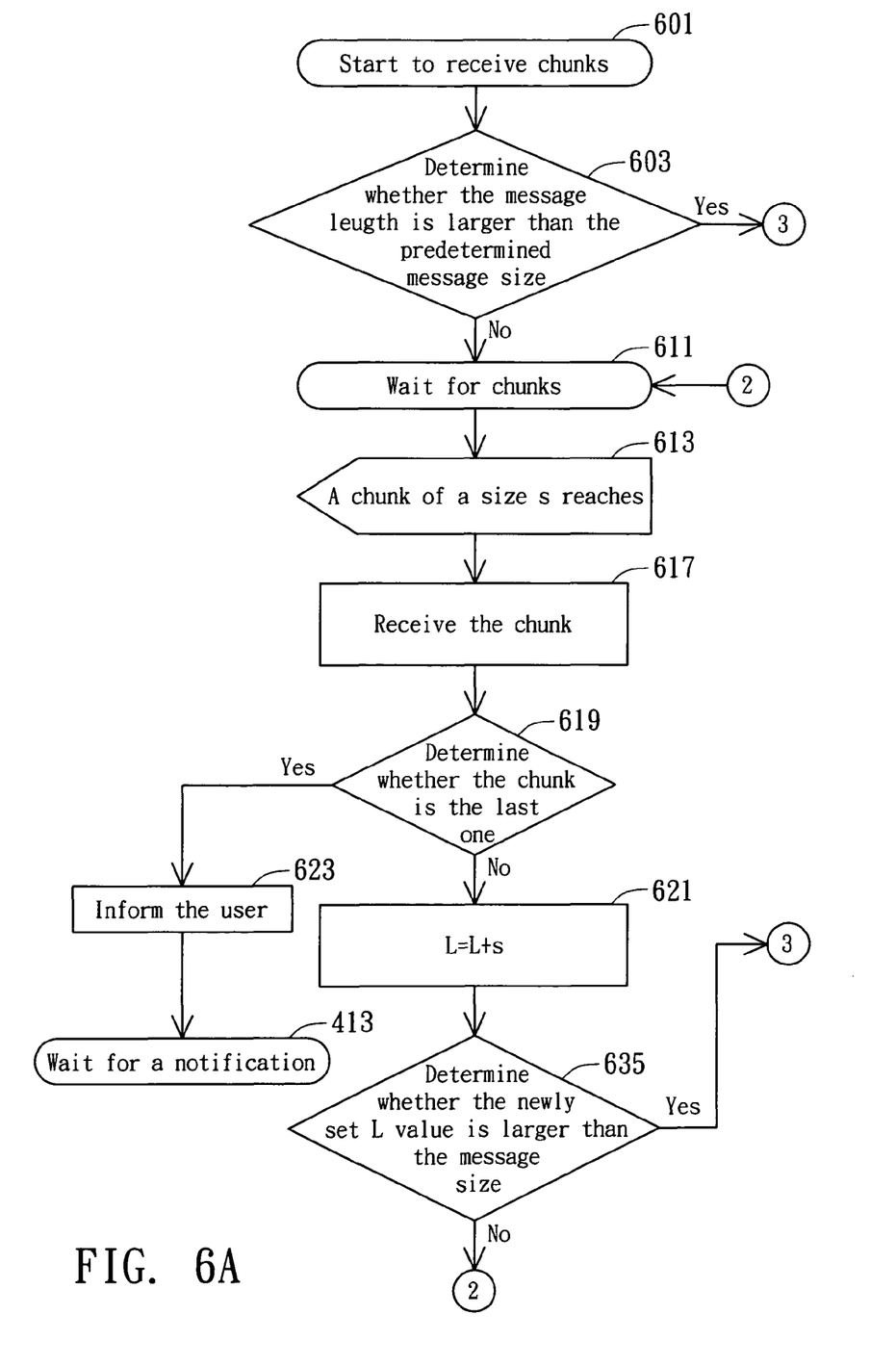
FIGS. 6A and 6B are flowcharts illustrating procedure of another embodiment.
Figure 6B:
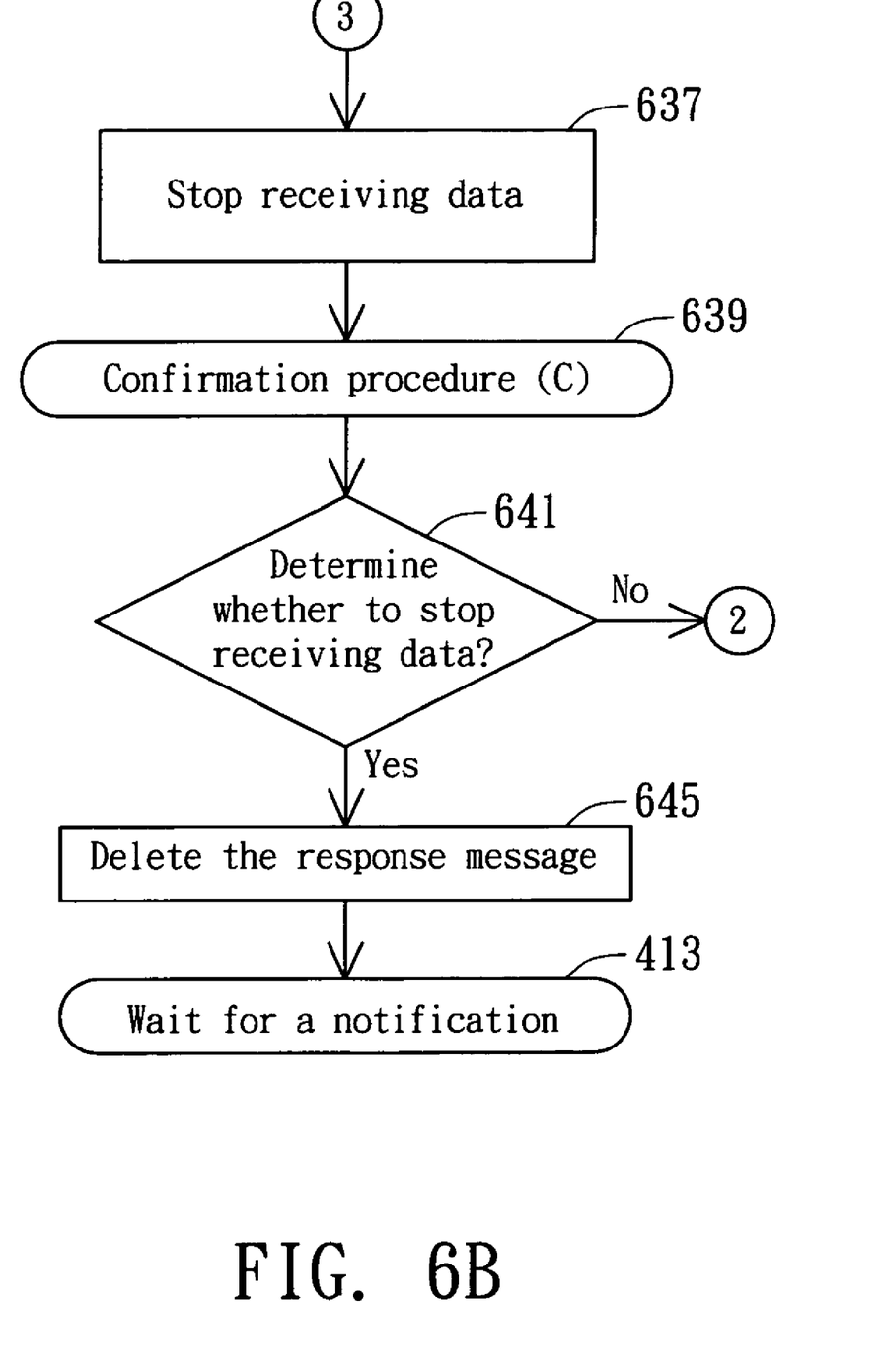

FIG. 6 is an example of the above-mentioned procedure of receiving chunks. In step 603, the received message length is compared with a predetermined message size. If soothe received message length is already larger than the predetermined message size, proceed to a confirmation procedure (C) (FIG. 6B). Otherwise, receive the second part of the response message. In step 611, the mobile apparatus waits for other parts of the response message. In step 613, the second part of the response message comes up and includes a chunk of a size s and the chunk is received in step 617. At this time, a total data length L is predetermined as the message length included by the first part of the above-mentioned response message. Next, in step 619, determine whether the (X+1)-th part (the received one at present should be the second part) is the last part of the response message,.that is, determine whether the (X+1)-th part includes the last chunk. The method is to determine whether the parameter of the last-chunk field included in the (X+1)-th part represents this chunk is the last one, such as determines whether the parameter is equal to 1. If so, stop this method. Afterward, the mobile apparatus informs the user as illustrated in step 623 that the response message has been completely received, that is, the multimedia message has been downloaded to the mobile apparatus successfully. Then the method returns to step 413 to wait for another notification.

If the determined result in step 619 is no, proceed to step 621, set the sum of message length s and total data length L of the (X+1)-th part to be the total data length L, that is, s+L→L. Next, determine whether the newly set total data length is larger than the message size. If so, proceed to the waiting assurance procedure (C). If not, set X to be X+1, and proceed to step 661 to wait for receiving next part of the response message. When the (X+1)-th part of the response message comes up, receive the (X+1)-th part of the response message and proceed to step 619. Then, repeat step 611 to step 635 until the last part of the response message is received or until the determining result in step 635 is yes.

If the value L+s is substantially larger than the message body size, the receiver terminal stops receiving data as in step 637. Afterward, proceed to step 639, perform the waiting assurance procedure (C) (FIG. 6B). In the waiting assurance procedure (C), the step 641 is for determining whether the user stops downloading other parts of the response message. If so, proceed to step 645, delete the received response message, and then return to step 403 to wait for notification. If not, proceed to step 611 to wait for receiving other parts of the response message again.

In the above-mentioned assurance procedure, when the user is too late to response and cause transmission broken, the mobile apparatus 1000 inquires the user whether to get online again. If the user would like to get online again, the mobile apparatus 1000 sends out the GET request 230 again. According to the format shown in FIG. 3B, the response message is divided into a number of parts, which are sent one by one. For this reason, the GET request 230 includes other messages for informing the message center of which part is received last time. The message center can thus send the next part and will not repeat sending the same part. Notably, the message center should have the successive sending function so as to prevent repeating transmission.

Furthermore, the mobile apparatus 100 may inform the user and inquire for assurance about whether to stop receiving data by using characters, pictures, sound, or vibration of the mobile apparatus via a user interface for communication between the user and the machine, such as a monitor.

Moreover, in step 509 or 635 when determining whether the message length of the response message is larger than the known message size, that is, the message body size SIZE_MSG_BODY obtained from the notification at the reception terminal, a certain error rate is allowed. For example, when the total data length is larger than the message body size, and the difference between these two values TOTAL_LENGTH-SIZE_MSG_BODY is larger than a predetermined error rate, such as 10%, it is considered that the total data length is substantially larger than the message body size. That is, if the difference is smaller than the predetermined error rate, the total data length is not substantially larger than message body size. In addition, in terms of various formats of response message, the total data length may be obtained according to the first part of the present response message (the first part 320 in FIG. 3A), or be determined by adding up the message length of the received different parts of response message (the first chunk size 355 in FIG. 3B).

In the above-mentioned embodiment, the mobile apparatus 1000 is an apparatus having mobile communication function, such as a mobile station, a general packet radio service (GPRS) compatible mobile phone, the third generation mobile station, a WAP mobile phone, or a portable device, like a personal digital assistant, or a car-use computer, or a notebook computer etc. The mobile apparatus at least includes a memory device 104 and a processor 102 coupled to the memory device. The processor 102 downloads program module (or application software including the program module) of multimedia reception from the memory device 104, and execute the program module of 5 multimedia reception in response to at least the message of the message center and control the mobile apparatus to perform multimedia message receiving operation. In the process of receiving multimedia messages, the mobile apparatus 1000 effectively prevents the multimedia message having a actual size larger than expected from being downloaded to the mobile station.

The method and mobile station disclosed according to the above-mentioned embodiment of the invention effectively prevents the multimedia message having an unexpected size from being downloaded to the mobile station so as to protect the user's right and prevent the user being deceived. Users are no more disturbed and spend unnecessary communication fee due to advertisement garbage messages and other unwanted messages. Thus, MMS quality and customer satisfaction of the mobile communication are improved, thereby helps the MMS market to be widespread.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for a receiver terminal to download a multimedia message from a message center in a wireless network, comprising:

receiving a notification at the receiver terminal from the message center, wherein the notification informs the receiver terminal of arrival of the multimedia message at the message center and the notification contains a predetermined message size indicating length of the multimedia message;

downloading at the receiver terminal a first portion of the multimedia message, which is not the entirety of the multimedia message; and confirming at the receiver terminal whether to continue downloading a second portion of the multimedia message, which is distinct from the first portion of the multimedia message, if the first portion of the multimedia message downloaded indicates that the actual size of the multimedia message exceeds the predetermined message size.

2. The method of claim 1, wherein the step of downloading a first portion of the multimedia message comprises sending a request to the message center according to the notification.

3. The method of claim 1, further comprising:

inquiring of a user of the receiver terminal whether to download the multimedia message if the predetermined message size is larger than a default value set by the user.

4. The method of claim 1, wherein the step of confirming whether to download the second portion of the multimedia message comprises inquiring of a user of the receiver terminal whether to download the second portion of the multimedia message.

5. The method of claim 1, wherein the step of confirmation whether to download the second portion of the multimedia message comprises automatically checking at least one condition.

6. The method of claim 1, wherein the first portion of multimedia message downloaded contains a message part having a parameter indicating the actual size of the multimedia message.

7. The method of claim 1, wherein the size of the first portion of the multimedia message downloaded is calculated and compared with the predetermined message size for indicating whether the actual size of the multimedia message exceeds the predetermined message size.

8. The method of claim 7, wherein the multimedia message is transmitted in a series of chunks, the first portion of multimedia message downloaded contains at least one chunk, and the size of the first portion of the multimedia message downloaded is calculated by accumulating chunk size of the at least one chunk.

9. The method of claim 1, wherein the wireless network is a telecommunication network and the receiver terminal is a mobile phone.

10. A mobile apparatus used in a network, comprising:

a memory device for storing a program; and a processor for executing the program that downloads a first portion of a multimedia message, which is not the entirety of the multimedia message, from a message center and confirms whether to continue downloading a second portion of the multimedia message, which is distinct from the first portion of the multimedia message, if the first portion of the multimedia message downloaded indicates that the actual size of the multimedia message exceeds a predetermined message size, wherein the program manipulates a notification transmitted from the message center, the notification informing about arrival of the multimedia message at the message center and the notification containing the predetermined message size indicating length of the multimedia message.

11. The mobile apparatus of claim 10, wherein the program sends a request to the message center according to the notification for downloading the first portion of the multimedia message.

12. The mobile apparatus of claim 10, wherein the program inquires a user whether to download the multimedia message if the predetermined message size is larger than a default value set by the user.

13. The mobile apparatus of claim 10, wherein the program confirms whether to download the second portion of the multimedia message by inquiring a user whether to download the second portion of the multimedia message.

14. The mobile apparatus of claim 10, wherein the program confirms whether to download the second portion of the multimedia message by automatically checking at least one condition.

15. The mobile apparatus of claim 10, wherein the first portion of multimedia message downloaded contains a message part having a parameter indicating the actual size of the multimedia message.

16. The mobile apparatus of claim 10, wherein the size of the first portion of the multimedia message downloaded is calculated and compared with the predetermined message size for indicating whether the actual size of the multimedia message exceeds the predetermined message size.

17. The mobile apparatus of claim 16, wherein the multimedia message is transmitted in a series of chunks, the first portion of multimedia message downloaded contains at least one chunk, and the size of the first portion of the multimedia message downloaded is calculated by accumulating chunk size of the at least one chunk.

18. The mobile apparatus of claim 10, wherein the network is a telecommunication network and the mobile apparatus is a mobile phone.

19. The method of claim 1, wherein the multimedia message is a Multimedia Message Service message.

20. The mobile apparatus of claim 10, wherein the multimedia message is a Multimedia Message Service message.

* * * * *